United States Patent [19]
Akasu

[11] Patent Number: 5,504,570
[45] Date of Patent: Apr. 2, 1996

[54] DISTANCE MEASURING EQUIPMENT

[75] Inventor: Masahira Akasu, Himeji, Japan

[73] Assignee: Mitsubishi Denki Kabushiki Kaisha, Tokyo, Japan

[21] Appl. No.: 189,713

[22] Filed: Feb. 1, 1994

[30]       Foreign Application Priority Data

Feb. 12, 1993  [JP]  Japan ..................................... 5-024246

[51] Int. Cl.⁶ .............................. G01C 3/08; B60T 7/16; B62D 1/24
[52] U.S. Cl. .......................... 356/5.05; 180/169; 356/5.01
[58] Field of Search .................... 356/5.01, 5.03, 356/5.05, 5.08; 180/167, 169

[56]              References Cited
             U.S. PATENT DOCUMENTS

| | | | |
|---|---|---|---|
| 3,900,261 | 8/1975 | Wingate | 356/5.03 |
| 4,344,705 | 8/1982 | Kompa et al. . | |
| 5,126,555 | 6/1992 | Hawryluk . | |
| 5,262,837 | 11/1993 | Shyy | 356/5.01 |

*Primary Examiner*—Stephen C. Buczinski
*Attorney, Agent, or Firm*—Sughrue, Mion, Zinn, Macpeak & Seas

[57]            ABSTRACT

Disclosed is a distance measuring apparatus having a clock generating element, a light emitting element, a light receiving element, a sample pulse generating element, a sample hold element and a processing element. The clock generating element generates a clock pulse at a predetermined time interval. The light emitting element generates a pulse beam in synchronism with the clock pulse. The light receiving element receives a reflected pulse beam from an object and converts it into an electric signal. The sample pulse generating element generates a sample pulse at a timing delayed by a predetermined minute time from a generating time of the clock pulse within one measuring period. The sample hold element effects sampling of an output signal from the light receiving element with the sample pulse. The processing element calculates a distance to the object by detecting it from the output signal of the sample hold element and from the delay time of the sample pulse. The processing element stops a generation of the pulse beam by the light emitting element with the measuring period determines an existence or non-existence of interference from the other light source exclusive of the light emitting element.

7 Claims, 6 Drawing Sheets

DISTANCE MEASURING EQUIPMENT

BACKGROUND OF THE INVENTION

1. Field of the Invention

The present invention relates to a distance measuring equipment for obtaining a distance to an object by irradiating the object with a pulse beam, receiving the pulse beam reflected from the object and thus measuring a time spent from the irradiation and the reception thereof.

2. Related Background Art

Figure 7:
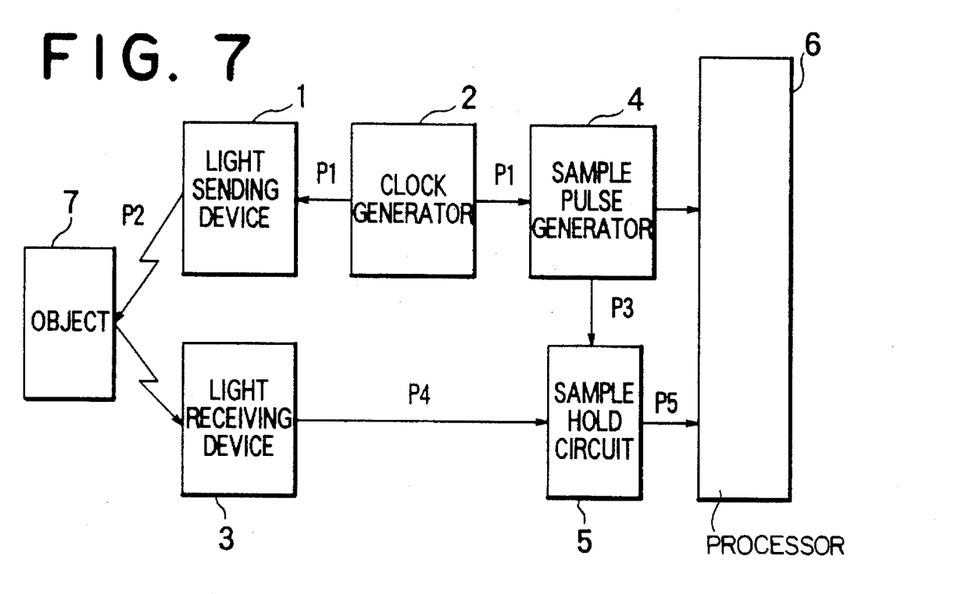
FIG. 7 is a block diagram illustrating a conventional distance measuring equipment.

This type of known distance measuring equipment is an optical radar system as disclosed in, e.g., Japanese Patent Laid-Open Publication No.2-228579. FIG. 7 is a diagram illustrating a construction of a conventional distance measuring equipment. A light sending device 1 generates a pulse beam P2 by actuating a light emitting element such as a laser diode, etc. . A clock generator 2, which has its output side connected to an input side of the light sending device 1, generates a clock pulse P1 serving as a generation timing for the pulse beam P2. The light sending device 1 inputs the clock pulse P1. A light receiving device 3 receives the pulse beam reflected from the object 7 irradiated with the pulse beam P2. The light receiving device 3 converts the pulse beam into an electric signal P4. A sample pulse generator 4, which has its input side connected to the other output side of the clock generator 2, counts the clock pulses P1 inputted from the clock generator 2. The sample pulse generator 4, at the same time, generates a sample pulse P3. A sample hold circuit 5 is connected to an output side of the light receiving device 3 and to an output side of the sample pulse generator 4. The sample hold circuit 5 performs sampling of the output signals P4 of the light receiving device 3 by use of the sample pulses P3 of the sample pulse generator 4. A processor 6 is connected to output sides of the sample pulse generator 4 and of the sample hold circuit 5. The processor 6 inputs a clock pulse count value from the sample pulse generator 4 and also an output signal from the sample hold circuit 5. The processor 6 thus detects a distance to the object 7.

Figure 8:
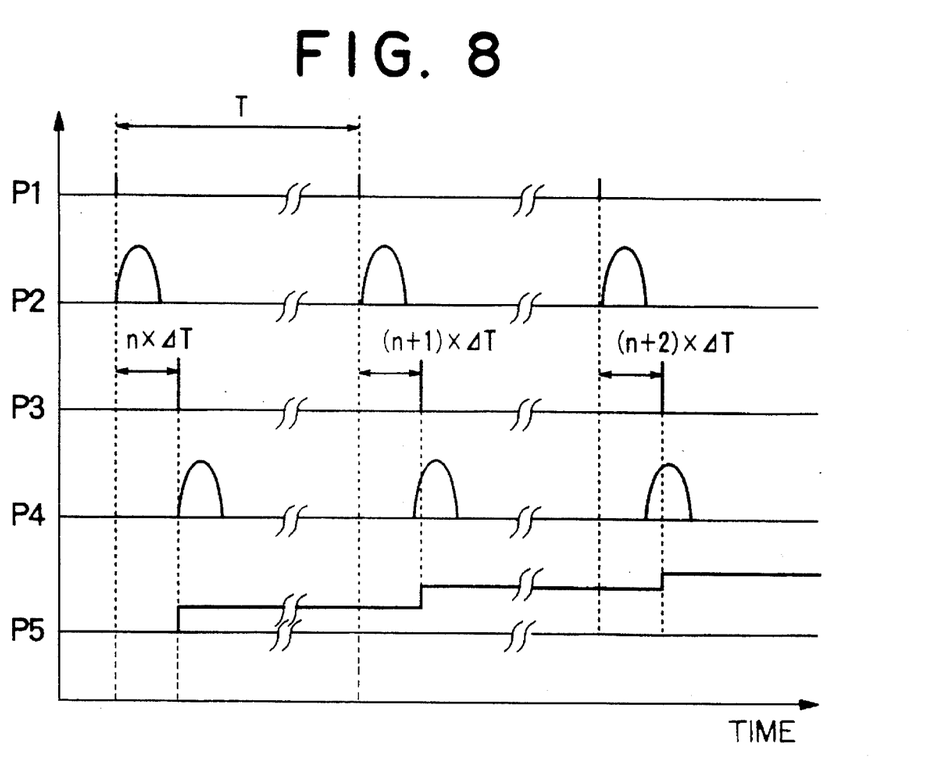
FIGS. 8 and 9 are timing charts each showing an operation of the equipment of FIG. 7.
Figure 9:
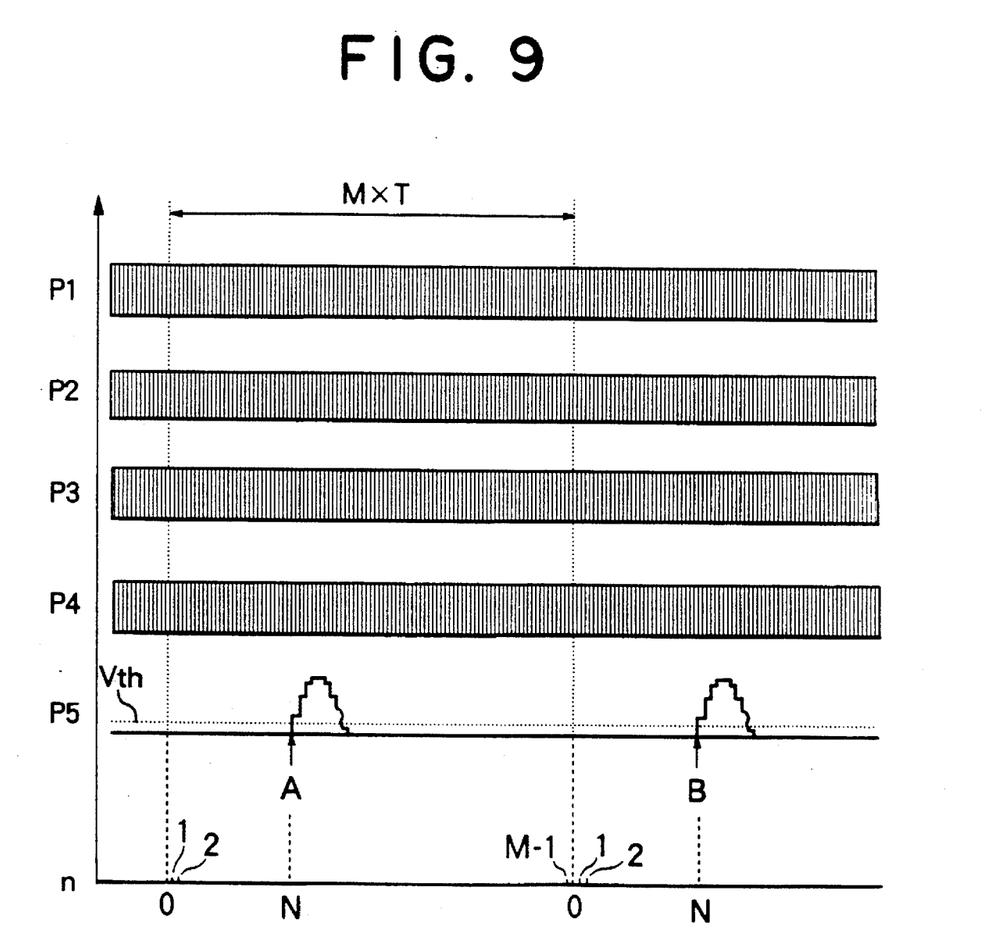

Next, an operation of the thus constructed conventional equipment will be explained with reference to FIGS. 8 and 9. FIG. 8 is a diagram illustrating operating waveforms within a clock pulse period of the clock generator 2. FIG. 9 is a diagram illustrating operating waveforms at a time interval when this distance measuring equipment measures the distance once. The clock generator 21 generates the clock pulse P1 at a time interval T longer than a time corresponding to the maximum measured distance. This clock pulse P1 is inputted to the light sending device 1. The light sending device 1 generates the pulse beam P2 in synchronism with this clock pulse P1. The light receiving device 3 receives this pulse beam P2 reflected from the object 7. The light receiving device 3 photoelectrically converts the reflected pulse beam into the electric signal and performs a high-frequency amplification thereof. The output signal P4 therefrom is inputted to the sample hold circuit 5. 0n the other hand, the sample pulse generator 4 counts the clock pulses P1 given from the clock generator 2. The sample pulse generator 4 repeats counting, wherein one period is a predetermined clock pulse count value M larger than a value obtained by dividing the maximum measured distance by a distance resolving power. At the same time, the sample pulse generator 4 generates a sample pulse P3 in which the clock pulse P1 is delayed by a time given by multiplying a minute time ΔT corresponding to the distance resolving power by a clock pulse count value n. The sample hold circuit 5 samples a pulse signal of the reflected beam with the above sample pulse P3. The sample hold circuit 5 holds a signal level thereof up to the next sample pulse P3. This held signal P5 is a signal in which a waveform of the high-frequency reflected pulse beam is frequency-converted into a low-frequency signal. The processor 6 compares the low-frequency output signal P5 of the sample hold circuit 5 with a threshold value Vth for detecting the reflected pulse beam and thus detects signals (A and B in FIG. 9) larger than the threshold value. A distance L between the distance measuring equipment and the object is obtained from a clock pulse count value N of the sample pulse generator 4 at this time in accordance with the following formula:

$$L = N \times \Delta T \times C/2 \qquad (1)$$

where C is the velocity of light. Namely, the distance L is ½ of a pulse beam travel obtained by multiplying a light emission-through-receipt time given from the clock pulse count value N by the light velocity C.

This type of distance measuring equipment detects the object by irradiating the object with the pulse beam and receiving the pulse beam reflected therefrom. If the light receiving device receives a pulse beam and it's reflected beam from the other light source exclusive of the reflected-from-the-object beam, however, the light receiving device is incapable of determining whether the relevant pulse beam is reflected from the object or comes from the other light source. Especially when the pulse beam from the other light source is incident thereon at a timing coincident with the sample timing of the sample hold circuit, the sample hold circuit samples the pulse beam signal of that light source. Hence, it follows that the processor performs a distance measuring operation with this pulse beam signal and outputs incorrect distance data. The above-mentioned problem relative to the incidence of the pulse beam from the other light source invariably arises when using this type of a plurality of distance measuring equipments. For instance, this type of distance measuring equipment is mounted on a vehicle and utilized for a system which gives an alarm to keep a safety car-to-car distance by measuring a distance to the foregoing car. In this case, if an oncoming car traveling on the opposite lane incorporates the same equipment, the pulse beam of the distance measuring equipment of the oncoming car is certainly incident on the distance measuring equipment of the self-car. The pulse beam from the oncoming car is a direct beam. Therefore, even when the oncoming car is located far away therefrom, an intensity of the beam incident on the light receiving device is much greater than that of the pulse beam reflected from an ordinary foregoing car. At this time, the pulse beam from the distance measuring equipment of the self-car and the pulse beam from the distance measuring equipment of the oncoming car are generated substantially at the same timing, with the result that the pulse beam from the oncoming car is misdetected. Even when there is no foregoing car traveling on the same lane as that of the self-car, it follows that the alarm is mistakenly given. As described above, when receiving the pulse beam from the light source other than the normal pulse beam reflected from the object, the pulse beam is misdetected. This turns out a serious problem relative to a safety and a reliability of a system when this type of equipment is employed as a sensor of the system for giving the alarm and controlling appliances.

SUMMARY OF THE INVENTION

It is a primary object of the present invention, which has been devised to obviate the above problems, to provide a distance measuring equipment capable of distinguishing disturbance beams when a light receiving device receives incidence of the disturbance beams such as a pulse beam and a reflected pulse beam from the other light source exclusive of a reflected pulse beam from an object with respect to a pulse beam generated by the distance measuring equipment and of detecting the incidence of the pulse beam from the other light source.

To accomplish this object, according to one aspect of the present invention, there is provided a distance measuring equipment comprising a clock generating element for generating a clock pulse at a predetermined time interval and a light emitting element for generating a pulse beam in synchronism with the clock pulse. This equipment also comprises a light receiving element for receiving a reflected pulse beam from the under-measurement object with respect to the pulse beam generated from the light emitting element and converting the reflected pulse beam into an electric signal and a sample pulse generating element for generating a sample pulse corresponding to each clock pulse at a timing delayed in sequence by a predetermined minute time from a generating time of each clock pulse within one measuring period in which a predetermined period for generating a plurality of clock pulses is set as a measuring period. The equipment further comprises a sample hold element for sampling an output signal from the light receiving element by use of the sample pulse and a processing element for calculating a distance to the under-measurement object by detecting the under-measurement object from the output signal from the sample hold element and from the delay time of the sample pulse, at the same time, stopping a generation of the pulse beam by the light emitting element with the measuring period after detecting the under-measurement object and determining an existence or nonexistence of interference from the other light source exclusive of the light emitting element on the basis of the output signal from the sample hold element during a period for which the generation of the pulse beam is stopped.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
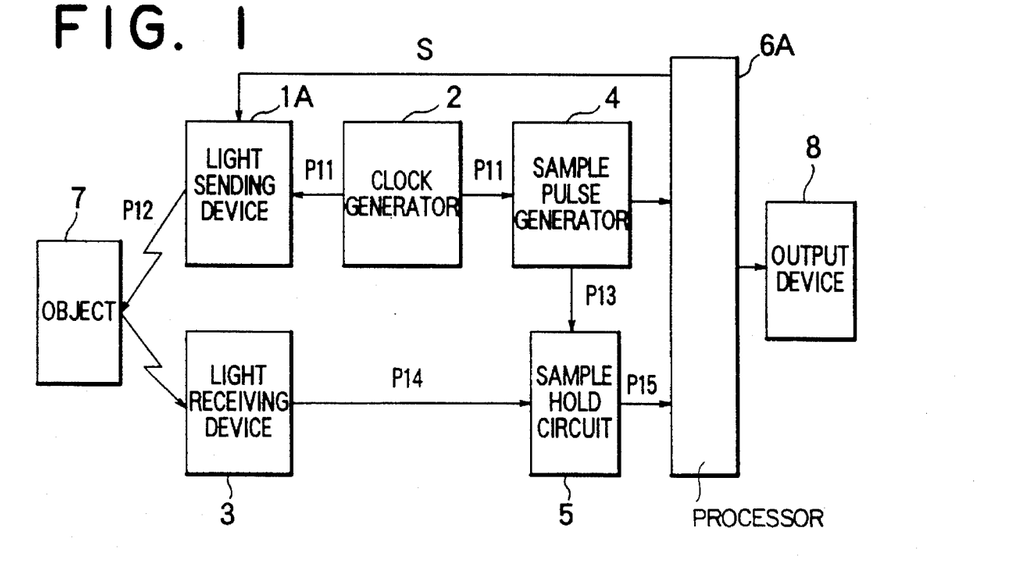
FIG. 1 is a block diagram illustrating a distance measuring equipment in accordance with one embodiment of this invention.

One embodiment of this invention will hereinafter be described with reference to the drawings. Turning to FIG. 1, a light sending device 1A generates a pulse beam P12 by actuating a light emitting element such as a laser diode, etc. A clock generator 2 connected to an input side of the light sending device 1A generates a clock pulse P11 serving as a pulse beam emitting timing of the light sending device 1A. A light receiving device 3 is disposed in side-by-side relationship with the light sending device 1A. A sample pulse generator 4 connected to the clock generator 2 counts the clock pulses P11 and generates a sample pulse P13 in which the above clock pulse P11 is delayed by a time interval corresponding to the count value thereof. A sample hold circuit 5 is connected to output sides of the sample pulse generator 4 and of the light receiving device 3. The sample hold circuit 5 performs sampling of the output signals P14 of the light receiving device 3 by use of the sample pulses P13 generated by the sample pulse generator 4. A processor 6A is connected to output sides of the sample pulse generator 4 and of the sample hold circuit 5. The processor 6A is, at the same time, connected to the light sending device 1A. The processor 6A compares the output signal P15 of the sample hold circuit 5 with a predetermined level. The processor 6A thus detects an object 7 and calculates a distance thereto. Simultaneously, the processor 6A gives the light sending device 1A a command to stop the generation of the pulse beams. Further, an output device 8 for outputting a measured distance to the object 7 is connected to the processor 6A.

Figure 2:
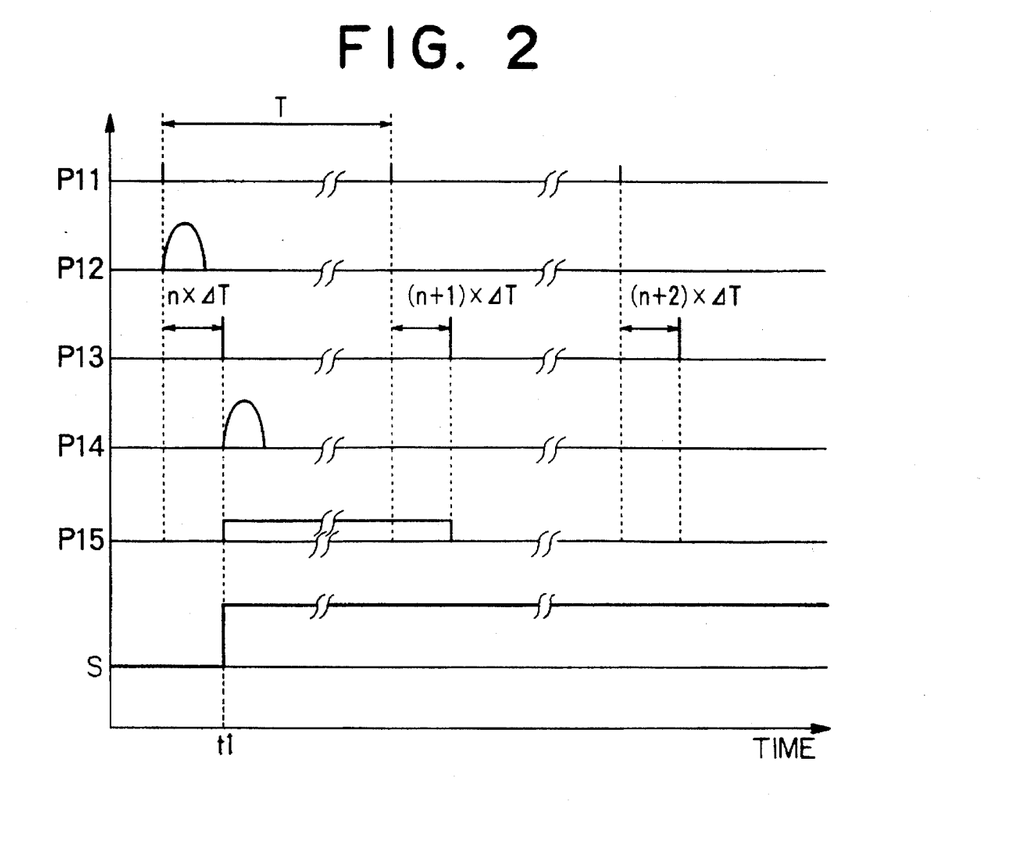
FIGS. 2 and 3 are timing charts each showing an operation of the embodiment.
Figure 3:
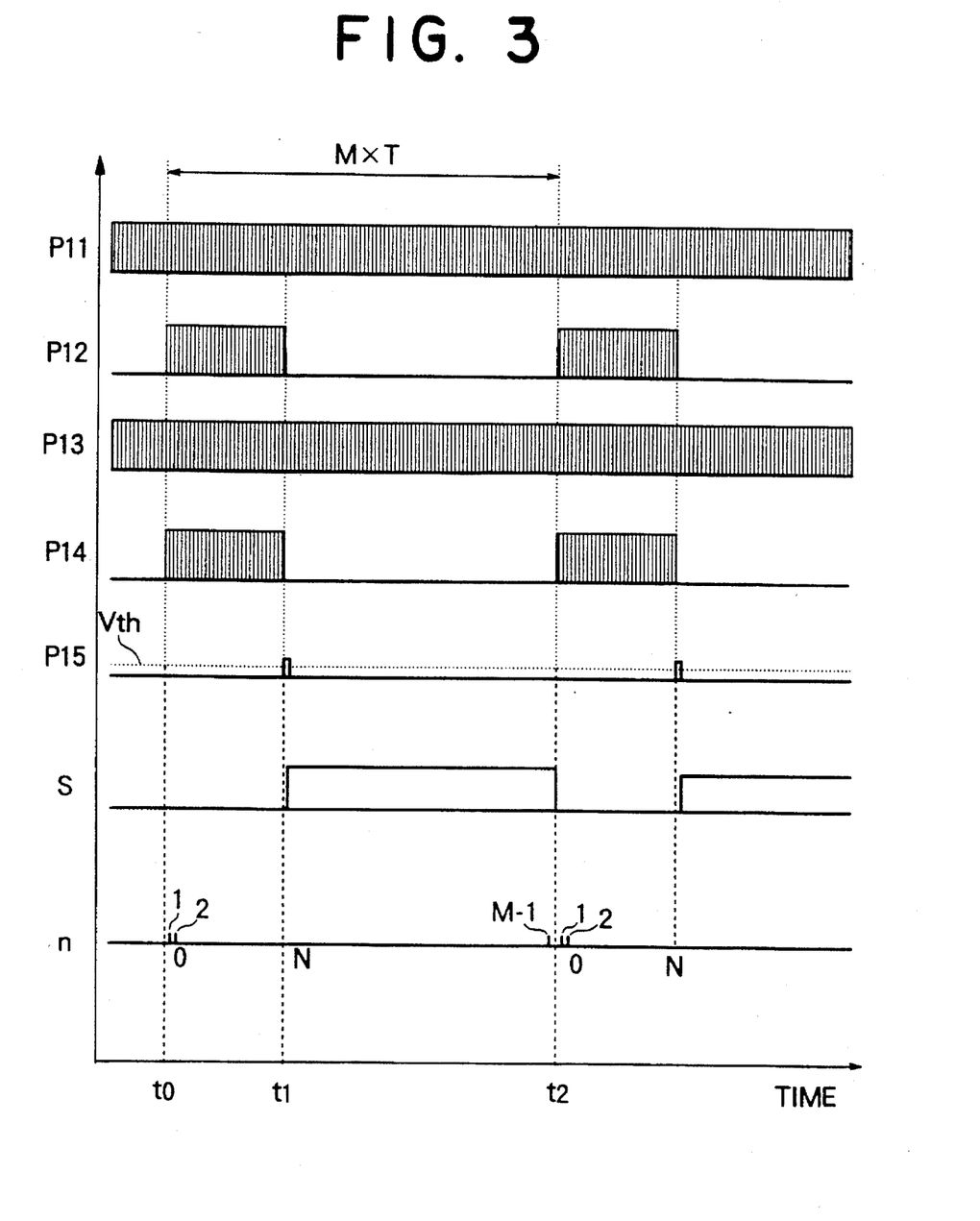

Next, operations of the this configured embodiment 1 will be explained with reference to FIGS. 2 and 3. FIG. 2 is a diagram illustrating operating waveforms within a clock pulse period of the clock generator 2. FIG. 3 is a diagram illustrating operating waveforms at a time interval for measuring a distance once.

A distance L to the object 7 is, as in the same way with the operation of the prior art, measured by irradiating the object 7 with the pulse beam P12. More specifically, as depicted in FIG. 2, the clock pulse P11 is generated from the clock generator 2 at a time interval T. The pulse beam P12 is generated from the light sending device 1A in synchronism with this clock pulse P11. The light receiving device 3 receives the pulse beam P12 reflected by the object 7. Hereat, the light receiving device 3 outputs an output signal P14 to the sample hold circuit 5.

On the other hand, the sample pulse generator 4 repeatedly counts the clock pulses P11 from the clock generator 2, wherein one period is a predetermined count value M. The sample pulse generator 4 outputs a count value n to the processor 6A. That is, the clock pulses P11 with the time interval T are counted on the assumption that counting is started at a timing t0 in FIG. 3. The count value n is reset to 0 at a timing t2 when the count value n becomes M, and counting continues. The sample pulse generator 4 further generates the sample pulse P13 delayed by a time obtained by multiplying a predetermined minute time ΔT by the clock pulse count value n with respect to each clock pulse P11. The sample pulse generator 4 outputs the sample pulse P13 to the sample hold circuit 5. The sample hold circuit 5 effects sampling of the output signal P14 from the light receiving device 3 by use of the sample pulse P13. The sample hold circuit 5 holds a signal level thereof up to the next sample pulse P13 and outputs a signal P15 assuming the thus held level.

The processor 6A compares the signal P15 outputted from the sample hold circuit 5 with a predetermined threshold value Vth. The processor detect the object 7 by detecting the signals P15 greater than the threshold value Vth. When the object 7 is thus detected at a timing t1 i.e., when the value of P15 is greater than the predetermined threshold level Vth, the processor 6A calculates the distance L to the object 7 from the clock pulse count value N inputted hereat from the sample pulse generator 4 in accordance with the above formula 1. At the same time (t1), the processor 6A outputs, to the light sending device 1A, a command signal S for stopping the generation of the subsequent pulse beams P12.

With this processing, even when the clock pulse P11 is inputted from the clock generator 2, the light sending device 1A generates no pulse beam P12, as shown in FIGS. 2 and 3. The command signal S from the processor 6A is continuously inputted to the light sending device 1A up to a timing t2 when the count value n of the clock pulses P11 through the sample pulse generator 4 is reset to 0. The generation of the pulse beams P12 for this duration is stopped. As a result, there is no output signal P14 from the light receiving device 3 up to the timing t2. The output signal P15 from the sample hold circuit 5 is also brought into a non-signal status.

It is noted, however, that as shown in FIG. 8, in the conventional apparatus, even though the output P5 of the sample and hold circuit 5 exceeds the predetermined threshold level, pulse beam signals P2 are still being generated. Hence, the light receiving device 3 is still receiving the reflected pulses and generating output signals P4, which are sampled by the sample and hold circuit 5. The signal P5 output by the sample and hold circuit thus continues to increase. This does not occur in the present invention unless, as discussed below, an interference signal is being received.

In the present invention, when the clock pulse count value n is reset at the timing t2, thereby entering a new measuring period, the processor 6A cancels the command signal S outputted to the light sending device 1A. The pulse beam P12 is thereby generated from the light sending device 1A in synchronism with the clock pulse P11. The same distance measuring operation is repeated. Note that the an output device 8 outputs the calculated distance L to the outside.

Figure 4:
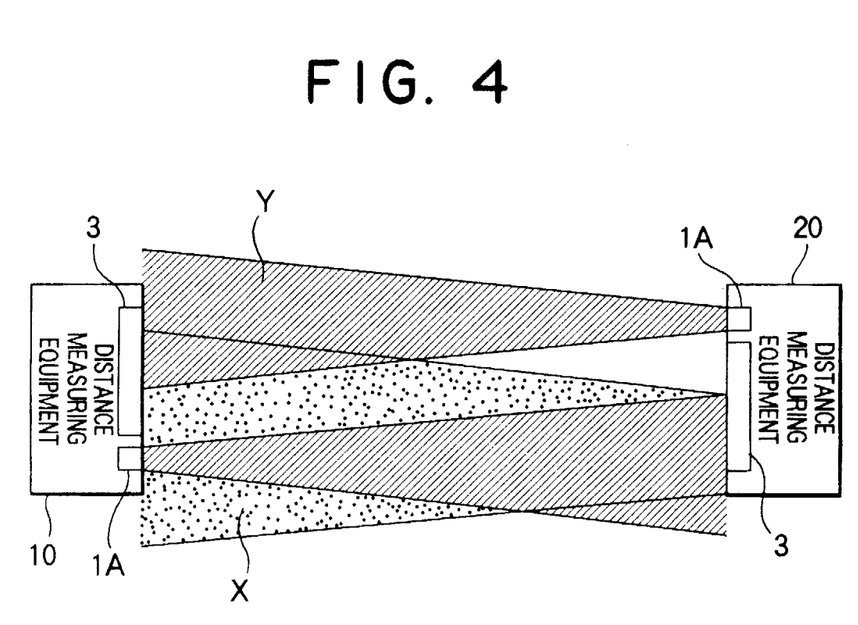
FIG. 4 is a diagram illustrating an applied example of the distance measuring equipment in the embodiment.
Figure 5:
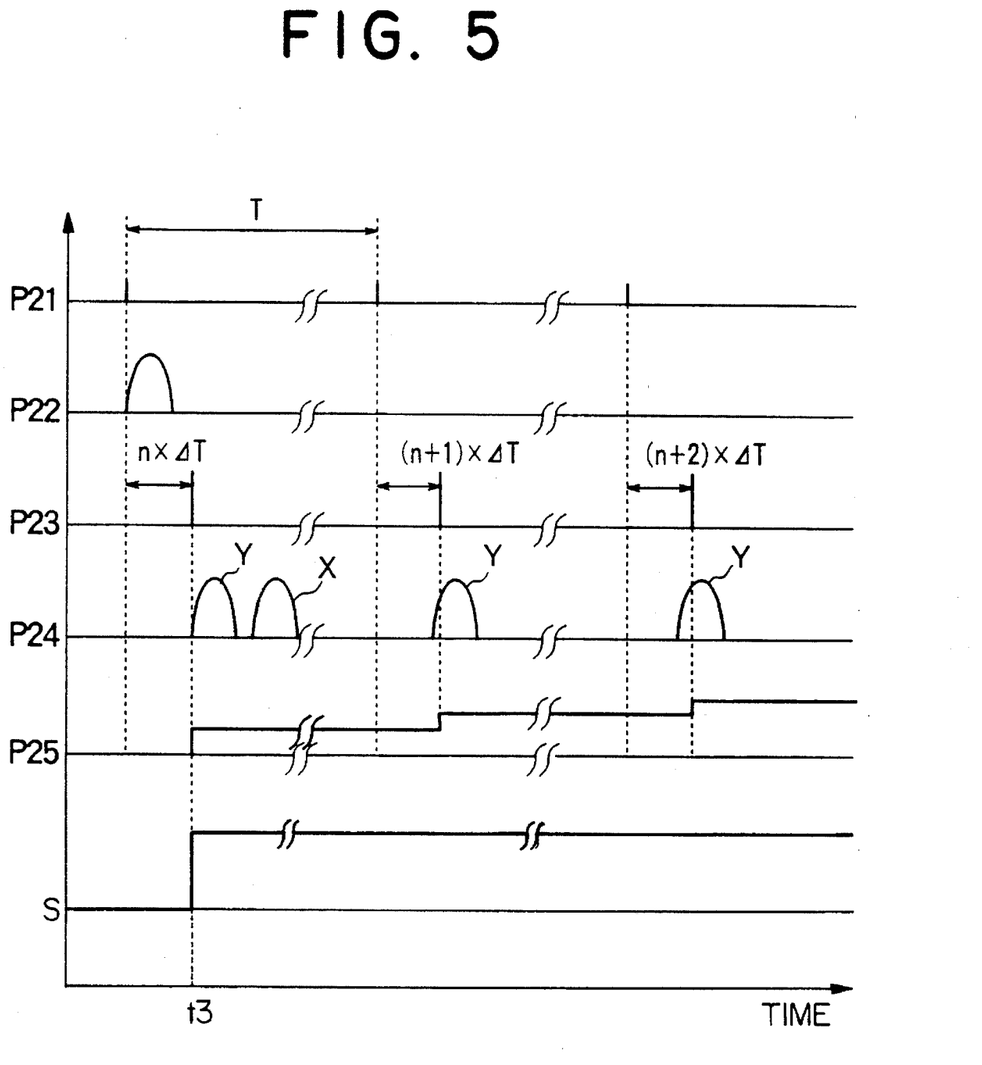
FIGS. 5 and 6 are block timing charts each showing an operation in the applied example of FIG. 4.
Figure 6:
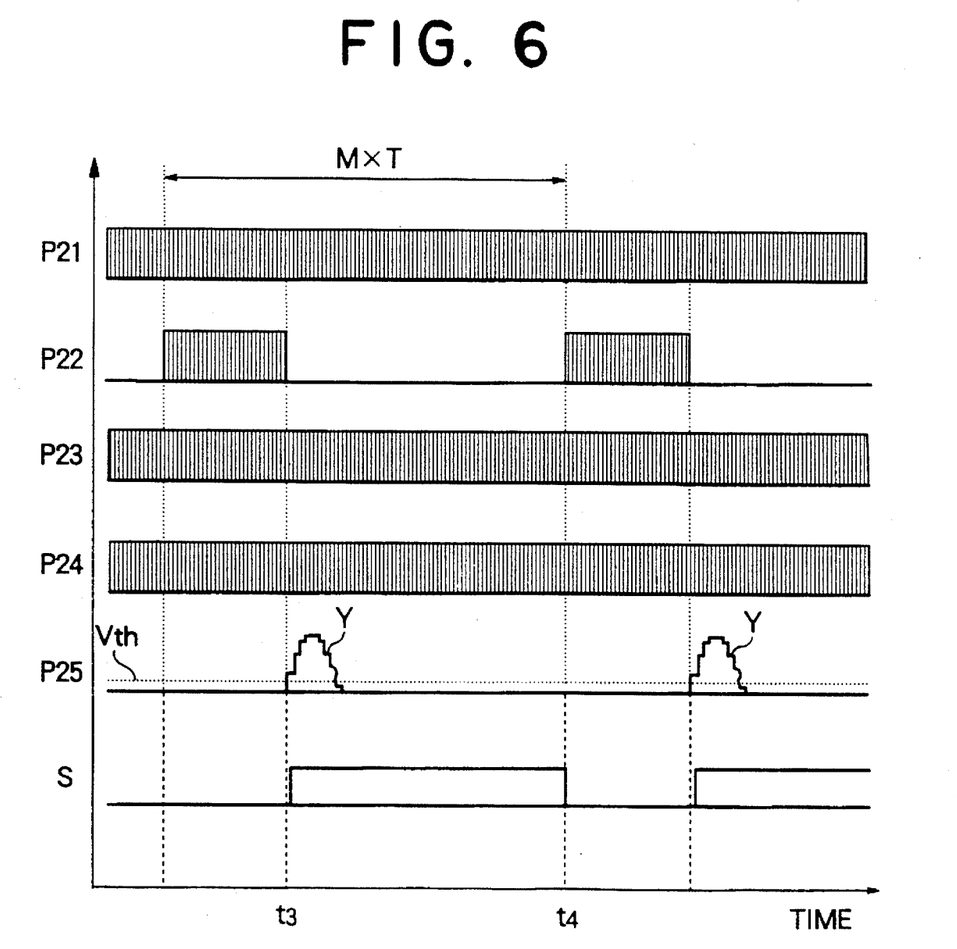

Herein, as illustrated in FIG. 4, it is assumed that first and second distance measuring equipments 10, 20 which are the same as that in the embodiment discussed above are installed in such positions as to enable the pulse beams to fall on the light receiving devices 3 each other. Given is an explanation of a case where the both of the distance measuring equipments 10, 20 simultaneously measure the distance. FIGS. 5 and 6 illustrate waveforms of respective signals within the first distance measuring equipment 10. The light sending device 1A generates a pulse beam P22. The pulse beam P22 reflected by the second distance measuring equipment 20 turns out a return reflected pulse beam (X in FIG. 4). The light receiving device 3 directly receives this return pulse beam. The light receiving device 3 directly receives, in addition to this beam, a pulse beam (Y in FIG. 4) generated from the second distance measuring equipment 20. For these pulse beams X, Y, detection signals P24 as shown in FIG. 5 are outputted from the light receiving device 3. This detection signal P24 undergoes sampling in the sample hold circuit 5 by use of a sample pulse P23.

The processor 6A compares the output signal P25 of the sample hold circuit 5 with the predetermined threshold value Vth. The processor 6A outputs the command signal S to the light sending device 1A at a timing t3 (which corresponds to timing t1 shown in FIGS. 2 and 3) when detecting the signal assuming a level greater than the threshold value Vth. The generation of the subsequent pulse beams P1 is thereby stopped. At the same time, the processor 6A calculates the distance. However, the pulse beam Y generated by the second distance measuring equipment 20 is not stopped, and therefore, the detection signal P24, which is generated due to the detection of pulse beam Y, is outputted from the light receiving device 3 even after the timing t3. For this reason, as illustrated in FIG. 6, a component of the pulse beam Y from the second distance measuring equipment 20 appears as it is in the output signal P25 of the sample hold circuit 5 and thus, the output of the sample and hold circuit continues to increase. Further, as shown in FIG. 5, the pulse beam Y from the second distance measuring equipment 20 is detected at the timing t3 before detecting the reflected pulse beam X from the second distance measuring equipment 20 which is to be originally measured in this example. Accordingly, the calculated distance L has an incorrect value.

Then, the processor 6A compares the output signal P25 from the sample hold circuit 5 with the predetermined threshold value Vth even after outputting the command signal S for stopping the light sending to the light sending device 1A. With this processing, it is possible to determine whether or not the output signal P25 from the sample hold circuit 5 contains an incorrect signal due to an interference from the other light source. That is, if the signal P25 assuming the level greater than the threshold value Vth is detected for a period from the timing t3 when outputting the command signal S to a timing t 4 when resetting the clock pulse count value n, it is possible to determine that the interference from the other light source takes place.

When thus determining that the interference from the other light source is caused, the processor 6A also enables the output device 8 to output information indicating invalidity of the result of measuring the distance together with the information saying that the interference is caused from the other light source by invalidating the calculated distance L at the timing t3.

Note that the description given above has dealt with an example where the pulse beam Y of the second distance measuring equipment 20 defined as the other light source is incident on the light receiving device 3 ahead of the reflected pulse beam X in terms of time with respect to the pulse beam P21 generated from the light sending device 1. A sequence of incidence of these pulse beams X, Y doest not exert any influence on the operation to detect the interference from the other light source. It is because the pulse beam component from the other light source is outputted to the output signal of the sample hold circuit 5 after the light sending stop command with the result that the non-signal status is not present, even if the pulse beam detected at first by the processor 6A is the pulse beam Y from the other light source or the reflected pulse beam X. The processor 6A is therefore capable of distinguishing an existence of the pulse beam from the other light source.

As discussed above, according to the present invention, it is possible to actualize the distance measuring equipment which is capable of surely detecting the interference due to the incidence of the pulse beam from the other light source but does not output a result of measuring an incorrect distance by detecting the pulse beam from the other light source. Further, if the distance measuring equipment of this invention is employed as a car-to-car distance measuring equipment for a car-to-car distance alarming system etc., the distance measuring equipment obtains the information saying that the result of measuring the distance is invalid with the detection of the interference from the other light source even when receiving the incidence of the pulse beam from the other light source. Advantages are therefore exhibited, wherein misalarming can be prevented based on this information, and a reliability on the system can be enhanced.

It is apparent that, in this invention, a wide range of different working modes can be formed based on the invention without deviating from the spirit and scope of the invention. This invention is not restricted by its specific working modes except being limited by the appended claims.

What is claimed is:

1. A distance measuring apparatus comprising:

a clock generating means for generating a clock pulse at a predetermined time interval;

a light emitting means for generating a pulse beam in synchronism with the clock pulse;

a light receiving means for receiving a reflected pulse beam from an object with respect to the pulse beam generated from said light emitting means and converting the reflected pulse beam into an electric signal;

a sample pulse generating means for generating a plurality of sample pulses, each corresponding to a respective said clock pulse, at a timing delayed in sequence by a respective predetermined time from a generating time of said respective clock pulse within one measuring period which is a predetermined period during which a plurality of said clock pulses are generated;

a sample hold means for sampling an output signal from said light receiving means by use of the sample pulses and outputting a sample hold output signal; and a processing means for calculating a distance to said object by detecting a presence of said object based on the sample hold output signal and the delay time of the sample pulse which resulted in said sample hold means outputting said sample hold output signal, and stopping generation of the pulse beam by said light emitting means for stopping period after receiving said sample hold output signal and determining an existence or non-existence of interference from another light source exclusive of said light emitting means on the basis of an output from said sample hold means which occurs during the stopping period.

2. The distance measuring apparatus according to claim 1, further comprising an outputting means for outputting the distance to said object which has been calculated by said processing means.

3. The distance measuring apparatus according to claim 2, wherein said processing means causes said outputting means to output information indicating that the calculated distance is invalid when determining that there exists an interference from the another light source.

4. The distance measuring apparatus according to claim 1, wherein said processing means detects said object by comparing said sample hold output signal with a thereshold value.

5. A distance measuring apparatus comprising:

a light emitting means for generating a pulse beam at a light emission timing in synchronism with a clock pulse in a direction of an object to be measured;

a light receiving means for receiving an incident beam including the pulse beam reflected by the object to be measured;

a distance measuring means for calculating a distance to the object by measuring a time from emission of the pulse beam to receipt of the incident beam;

a light emission stopping means for stopping the emission of the pulse beam at at least a next light emission timing after said distance measuring means calculates a distance; and an interference detecting means for determining an existence or non-existence of interference light in the incident beam on the basis of light received by said light receiving means during a period at which the emission of the pulse beam is stopped.

6. The distance measuring apparatus according to claim 5, wherein said interference detecting means determines that an interference light exists when said light receiving means receives light during a period at which the emission of the pulse beam is stopped.

7. The distance measuring apparatus according to claim 5, wherein said interference detecting means stores light intensity data received by said light receiving means during the measurement of a distance by said distance measuring means, and determines an existence or non-existence of interference light in the incident beam by comprising an intensity of light received by said light receiving means during a period at which the emission of the pulse beam is stopped with the stored intensity data.

* * * * *

UNITED STATES PATENT AND TRADEMARK OFFICE
CERTIFICATE OF CORRECTION

PATENT NO. : 5,504,570
DATED : April 2, 1996
INVENTOR(S) : Akasu

It is certified that error appears in the above-indentified patent and that said Letters Patent is hereby corrected as shown below:

In the Drawings:
Insert the attached Figure 4 after Drawing Sheet 2 of 6.

Signed and Sealed this

First Day of July, 1997

Attest:

Attesting Officer

BRUCE LEHMAN

Commissioner of Patents and Trademarks